United States Patent [19]

Wilhelm

[11] Patent Number: 4,532,595

[45] Date of Patent: Jul. 30, 1985

[54] LOAD-MONITORING SYSTEM FOR BOOM-TYPE CRANE

[75] Inventor: Wolfgang Wilhelm, Ratingen-Hösel, Fed. Rep. of Germany

[73] Assignee: Krüger GmbH & Co. KG, Essen, Fed. Rep. of Germany

[21] Appl. No.: 446,246

[22] Filed: Dec. 2, 1982

[51] Int. Cl.³ .............................................. G06F 15/20

[52] U.S. Cl. .................................... 364/463; 212/153; 340/685

[58] Field of Search ........................ 212/153; 340/685; 364/424, 463

[56] References Cited

U.S. PATENT DOCUMENTS

| | | | |
|---|---|---|---|
| 3,489,294 | 1/1970 | Greb et al. | 212/150 |
| 3,534,355 | 10/1970 | Fathauer | 340/685 X |
| 3,638,211 | 1/1972 | Sanchez | 340/685 X |
| 3,740,534 | 6/1973 | Kezer et al. | 340/685 X |
| 3,819,922 | 6/1974 | Horn et al. | 364/424 |
| 3,833,130 | 9/1974 | Gerdes et al. | 340/685 X |
| 3,990,584 | 11/1976 | Strawson et al. | 340/685 X |
| 4,052,602 | 10/1977 | Horn et al. | 364/424 |
| 4,054,055 | 10/1977 | Simon | 340/685 X |
| 4,057,792 | 11/1977 | Pietzsch et al. | 340/685 |
| 4,063,649 | 12/1977 | Hubbard et al. | 340/685 X |
| 4,178,591 | 12/1979 | Geppert | 340/685 |
| 4,185,280 | 1/1980 | Wilhelm | 340/685 X |
| 4,228,681 | 10/1980 | Pruex | 364/567 X |
| 4,368,824 | 1/1983 | Thomasson | 340/685 X |
| 4,456,093 | 6/1984 | Finley et al. | 364/563 X |

FOREIGN PATENT DOCUMENTS

| | | |
|---|---|---|
| 1107116 | 3/1968 | United Kingdom . |

*Primary Examiner*—Errol A. Krass
*Assistant Examiner*—Edward R. Cosimano
*Attorney, Agent, or Firm*—Karl F. Ross; Herbert Dubno

[57] ABSTRACT

A memory aboard a boom-type crane stores the coefficients of several polynomials of at least the fifth order closely approximating respective curves giving the maximum permissible load for different boom lengths as a function of the elevational angle of the boom (or the horizontal projection of its length). The set of coefficients read out under the control of a boom-length sensor is fed to a processor which calculates, for a given angle (or projection) as measured by another sensor, the numerical value of the maximum load corresponding to the selected polynomial. The actual value of the load, e.g. as detected by the hydraulic pressure of a jack engaging the boom at an intermediate point, is compared with the permissible maximum calculated by the processor; if that maximum is exceeded, an alarm is given.

4 Claims, 20 Drawing Figures

LOAD-MONITORING SYSTEM FOR BOOM-TYPE CRANE

FIELD OF THE INVENTION

My present invention relates to a load-monitoring system for a crane of the boom or jib type, designed to alert an operator to the fact that the load moment of the crane is about to surpass a critical magnitude and/or to prevent directly the establishment of an overload situation.

BACKGROUND OF THE INVENTION

As is well known in the art, the effective load movement of such a crane depends not only on the weight of a load suspended from its hoisting cable but also on the length of its boom and its angle of inclination or elevation. The point at which this moment begins to impair the stability of the crane, when the same is designed as a mobile vehicle, is also determined in each instance by the dimensions of its base and, at least in the absence of lateral outrigger-type supports, by the azimuthal angle included between the boom and the vehicular axis. Reference in this connection may be made, for example, to U.S. Pat. Nos. 3,638,211 and 3,740,534 as well as others listed therein as cited references.

From the patents referred to above it is known to provide such a crane with a computer including a memory digitally storing information peculiar thereto, the memory being addressable by a boom-angle sensor and a boom-length sensor to read out a numerical value representing the maximum load that can be safely supported under the existing operating conditions. This value is compared with the magnitude of the load actually measured and an alarm signal is given if the measured magnitude approaches the stored value.

Such a memory must have a large storage capacity in view of the many combinations of boom length, boom angle and possibly other parameters that have to be taken into account.

It is also known, e.g. from British Pat. No. 1,107,116, to use an analog computer for the purpose of determining the maximum permissible load moment on the basis of signals measuring such parameters as the boom angle and the tension of a hoisting cable supporting the load. As more particularly described in that British patent, the computer may operate along a straight line or a curve—e.g. an arc of a circle or a parabola—which approximates a curve representing the permissible maximum load as a function of angle of elevation. A path corresponding to that straight line or curve can be traced by a lever or a slide coacting with suitable markings.

A straight line or even a second-order curve such as a parabola, however, is only a rather rought approximation of the actual load characteristic of a crane of the kind here envisaged. In order to satisfy national and international regulations concerning crane safety, a control system of this simplified type would have to be so designed that the deviations lie on the "safe" side of that characteristic; this entails an underutilization of the load-carrying capacity in many instances.

OBJECT OF THE INVENTION

The object of my present invention, therefore, is to provide an improved load-monitoring system which does not require a memory of large storage capacity while allowing a good approximation of the actual load characteristic of a crane in order to prevent the establishment of overload conditions.

SUMMARY OF THE INVENTION

A system according to my present invention comprises first sensing means for generating a first signal representative of effective boom length, second sensing means for generating a second signal representative of the elevational angle of the boom, and a memory storing a plurality of sets of coefficients of polynomials of at least the fifth order closely approximating respective curves giving the maximum permissible load for different boom lengths as a function of variable parameter relating to boom inclination. That parameter could be the elevational boom angle itself but may also be the horizontal (or vertical) projection of the boom given by its length times the cosine (or sine) of that angle. In some instances it may even suffice to measure the extent to which the boom projects horizontally beyond its support, specifically its vehicular base. The memory is addressable by the first sensing means for reading out a set of coefficients, selected in response to the first signal, to a processor which is also connected to the second sensing means for calculating a numerical value of the polynomial defined by the selected set of coefficients which corresponds to the variable parameter as determined by the second signal. A comparator with inputs connected to the processor and to measuring means engageable with the boom, for determining the magnitude of a load supported thereby, generates an alarm signal whenever that magnitude exceeds a permissible limit determined by the calculated numerical value. The term "alarm signal", as here used, encompasses not only an indication given to an operator but also a possible command preventing the boom-positioning mechanism from inadmissibly changing the elevational angle.

The memory, which is preferably of the read-only type, may be reprogrammable to modify the stored set of coefficients in accordance with structural changes of the crane to which the system is applied.

The measurement of the actual load may be carried out, as in the system of the above-identified British patent, by a sensor responsive to the tension of the boom-hoisting cable. An alternative measuring device, also known per se, is a pressure sensor connectable with a cylinder of a hydraulic jack which serves to adjust the angle of elevation and which is anchored to a fixed base and to an intermediate point of the boom; see also my prior U.S. Pat. No. 4,185,280. The output of such a pressure sensor is a signal dependent not only on the live load suspended from the cable but also on the dead weight of the boom itself and any ancillary jib serving as an extension thereof. The relationship between that output signal and the elevational angle is a function which, as I have found, can be quite closely approximated by a polynominal of the fifth or the sixth order having five or six coefficients, respectively. Higher-order polynomials could, of course, be used, yet this would call for additional storage capacity which generally will not be necessary.

BRIEF DESCRIPTION OF THE DRAWING

The above and other features of my invention will now be described in detail with reference to the accompanying drawing in which.

SPECIFIC DESCRIPTION

Figure 19:
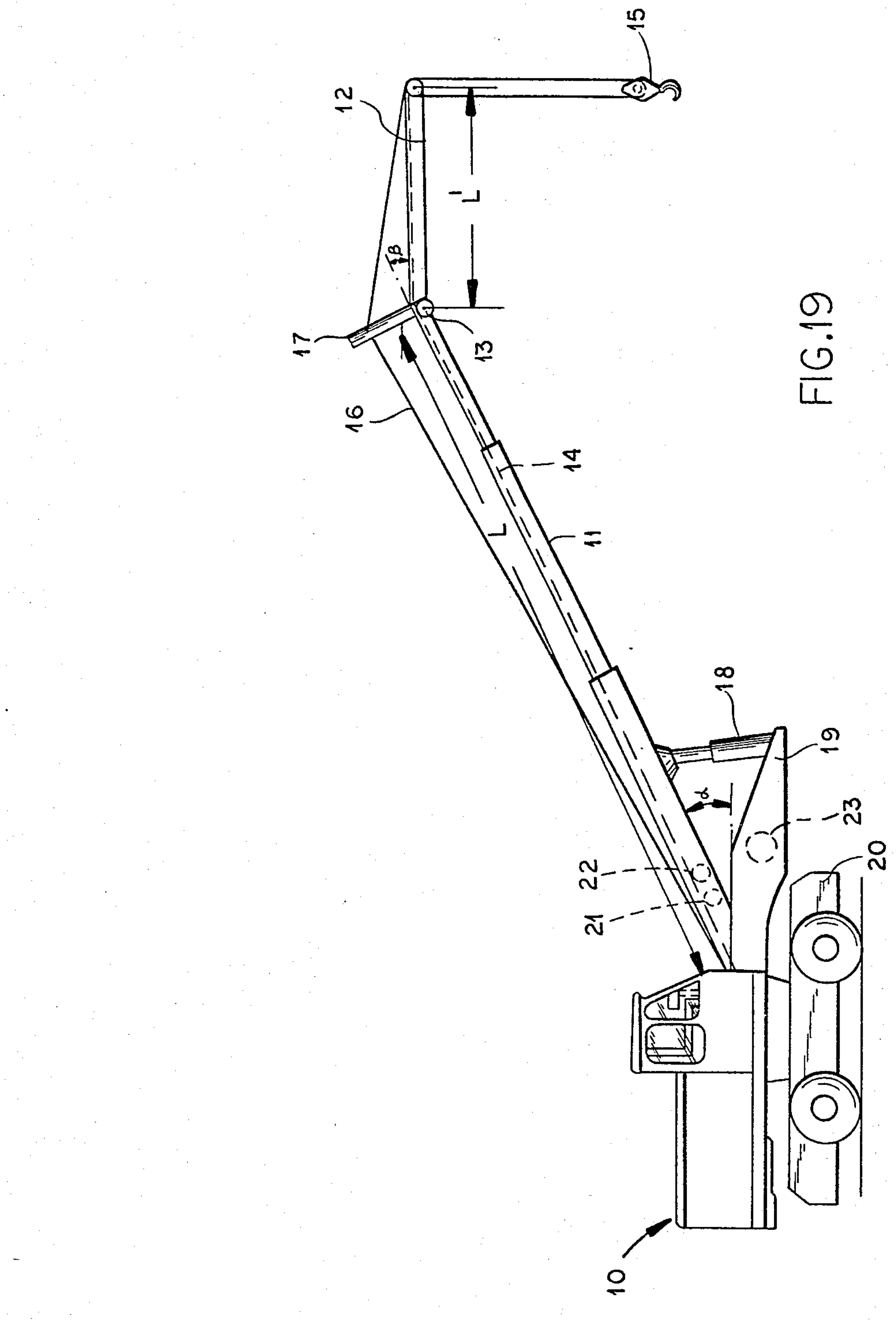
FIG. 19 is a somewhat schematic side-elevational view of a crane equipped with such a system.

Reference will first be made to FIG. 19 in which I have shown a mobile crane 10 of a type known per se, comprising an extendable main boom 11 with telescoped sections and an ancillary boom or jib 12 articulated thereto at 13. A hoisting cable 14 passes around both booms and supports a hook 15 designed to carry a load not shown. Boom 11 is inclined to the horizontal at an elevational angle $\alpha$ which can be varied by a hydraulic jack 18 under the control of the crane operator. Jib 12 includes with boom 11 an angle $\beta$ which is adjustable with the aid of a cable 16 deflected by a brace 17. The jack 18 is anchored to a platform 19 which, together with the operator's cab, is rotatable in the usual manner about a vertical axis on a wheel-supported base 20. This base may be provided with outriggers, e.g. as shown in the two above-identified U.S. patents, which have not been illustrated.

The variable length L of the main boom 11 is measured by a sensor 21 while its elevational angle $\alpha$ is determined by a sensor 22, both of which may be of the type described in the first two U.S. patents referred to. Another type of boom-length sensor, which can also be used, is described in U.S. Pat. No. 3,489,294. The jib 12 has a constant length L'. The elevation of boom 11 is controlled by the pressure of hydraulic fluid fed to jack 18, that pressure being measured by a sensor 23 on support 19.

Figure 20:
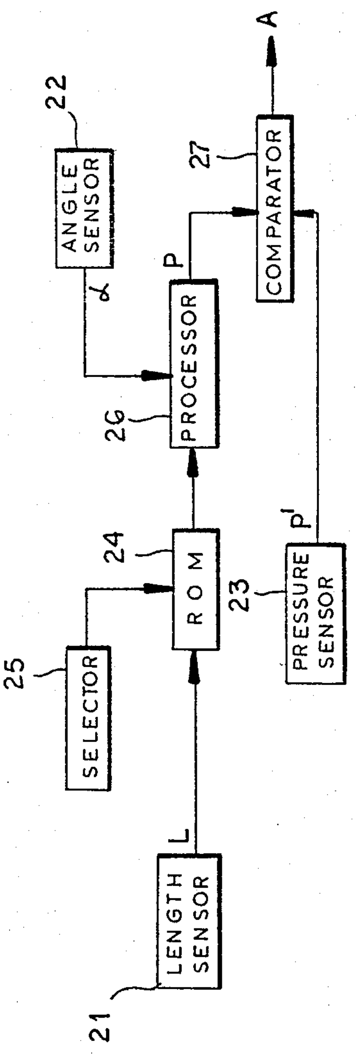
FIG. 20 is a block diagram of that system.

FIG. 20 shows a load-monitoring system according to my invention installed aboard the crane 10 of FIG. 19. The system comprises a preferably programmable read-only memory 24 with an address input extending from length sensor 21 and another address input originating at a manual selector 25 which is settable in various positions depending on the utilization of nonutilization of outriggers and of the ancillary boom or jib 12 as well as on the azimuthal angle by which the operator's cab and the boom have been rotated from the forward-pointing position illustrated in FIG. 19. If the jib 12 is used, its angle of relative inclination $\beta$ will also be fed to the memory 24 by the selector 25.

Memory 24 is divided into a number of sections, jointly addressable by sensor 21 and selector 25, each storing a set of coefficients assigned to a respective polynomial which approximates the actual values of the maximum permissible hydraulic pressure of jack 18 for different elevational angles $\alpha$ within a predetermined operating range. These actual pressures, as empirically determined for a multiplicity of values of $\alpha$, lie at more or less closely spaced points of a coordinate system which may be interconnected by straight lines or in stepped fashion to form a polygonal trace. In practice, that trace may be approximately linear in an intermediate part of the range but will significantly depart from linearity for the lowest and the highest values of $\alpha$.

A processor 26, receiving the coefficients read out from memory 24 under the control of sensor 21 and selector 25, plots from these coefficients a polynomial curve approximating the aforementioned polygonal trace within the range of variation of elevational angle $\alpha$. The instantaneous magnitude of angle $\alpha$ is supplied by sensor 22 to processor 26 which on the basis thereof delivers a signal proportional to pressure P to a comparator 27. Sensor 23 supplies that comparator with a signal proportion to the actual hydraulic pressure P' which at no time should exceed the permissible value P. Comparator 27, therefore, emits an alarm signal A whenever the magnitude of P' closely approaches the value P; signal A may visually or audibly alert the crane operator and/or may inhibit the positioning mechanism from changing its elevational angle.

The graphs of FIGS. 1–18 show in full lines respective curves representing the polynomial $P(\alpha)$ for different sets of parameters reflected by the output signals of sensor 21 and selector 25, with angle $\alpha$ read on the abscissa and pressure P read along the ordinate. Also shown in some of these graphs, in phantom lines, are segments of the empirically determined polygonal traces referred to above, to the extent that these traces deviate significantly from the associated polynomial curves. With the exception of FIGS. 12–15, these graphs apply to the crane 10 of FIG. 19 stabilized by the nonillustrated outriggers; FIGS. 1–10 correspond to different lengths L of main boom 11, with FIGS. 12–15 relating to the same boom lengths as FIGS. 1–4 but without outriggers. FIGS. 11 and 16–18 pertain to the presence of the ancillary jib 12 of length L' inclined at different angles $\beta$ to the main boom 11; in all the other instances the load is suspended directly from the end of that main boom. These examples are all for the forward-pointing position of FIG. 19.

Figure 1:
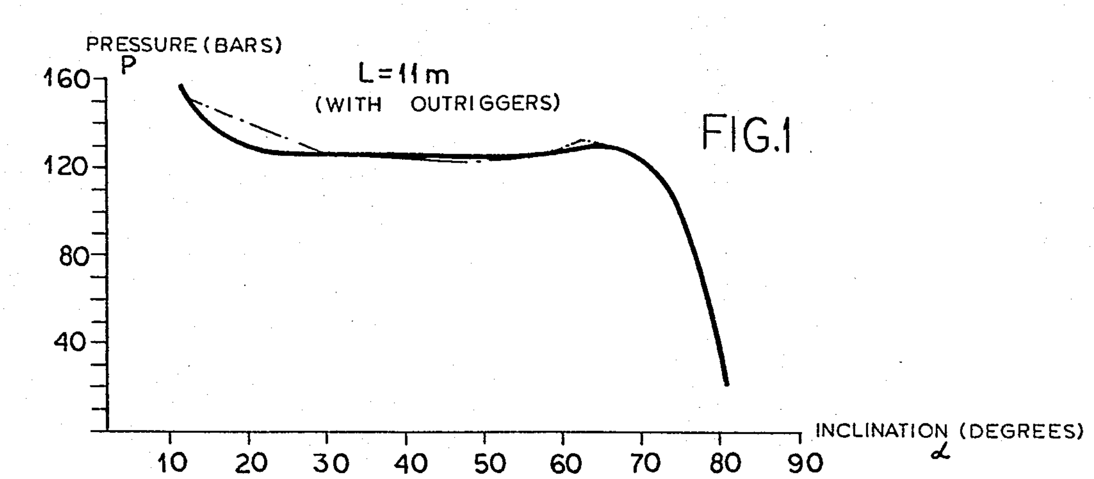
FIGS. 1-18 are graphs showing polynomials, relating to different operating conditions of a crane, whose coefficients are to be stored in a load-monitoring system according to my invention.
Figure 2:
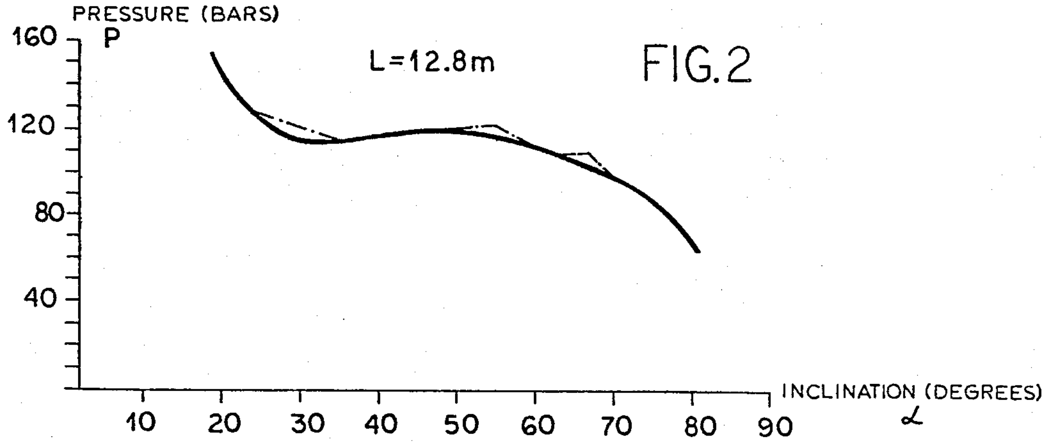
Figure 3:
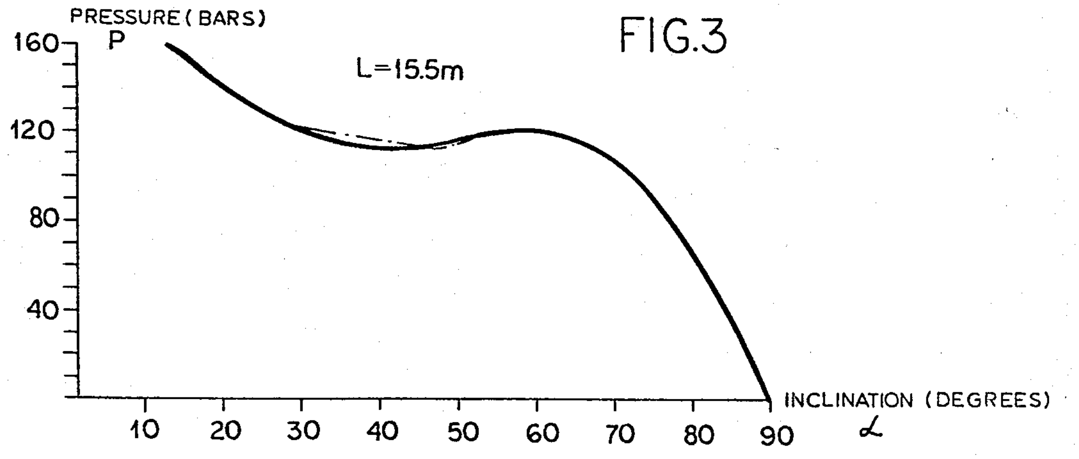
Figure 4:
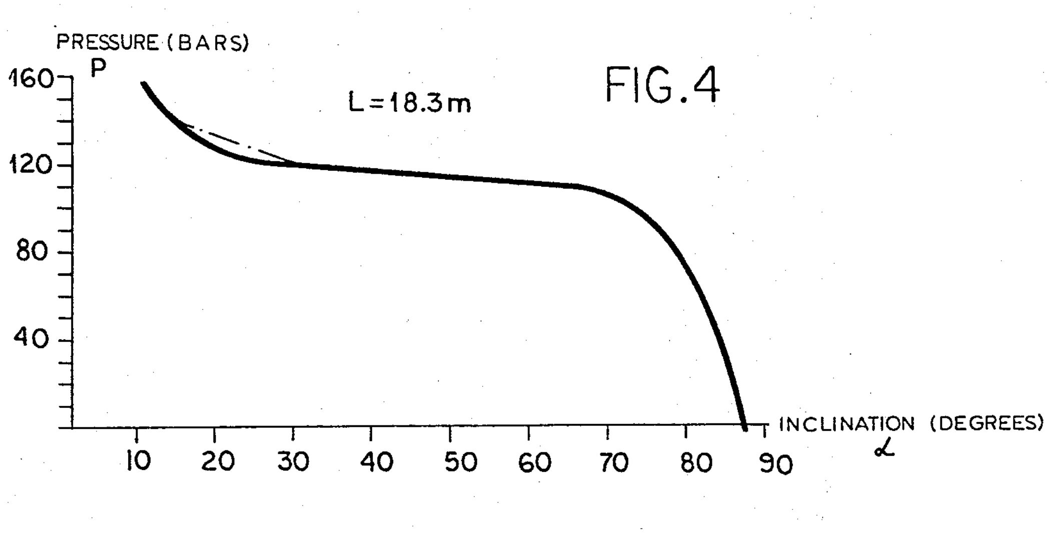
Figure 5:
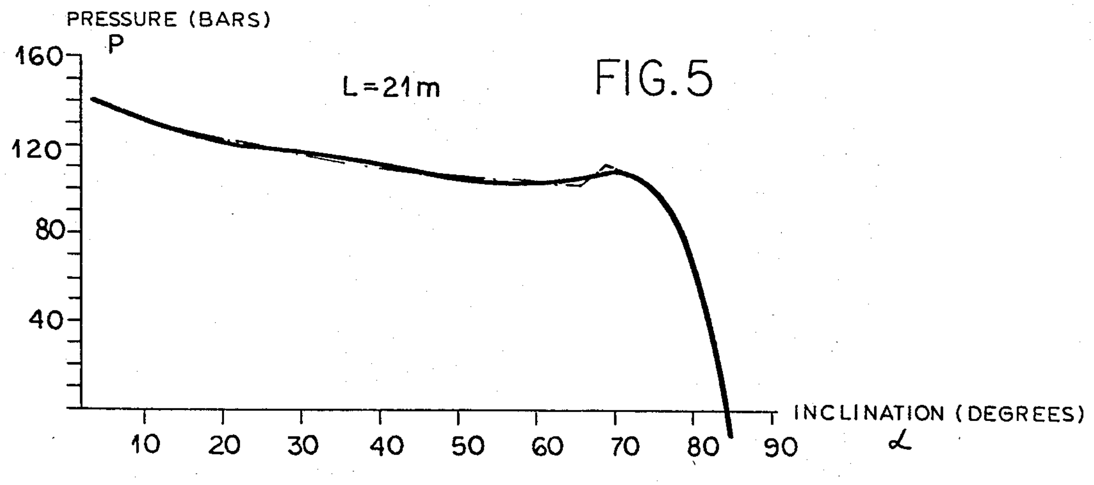
Figure 6:
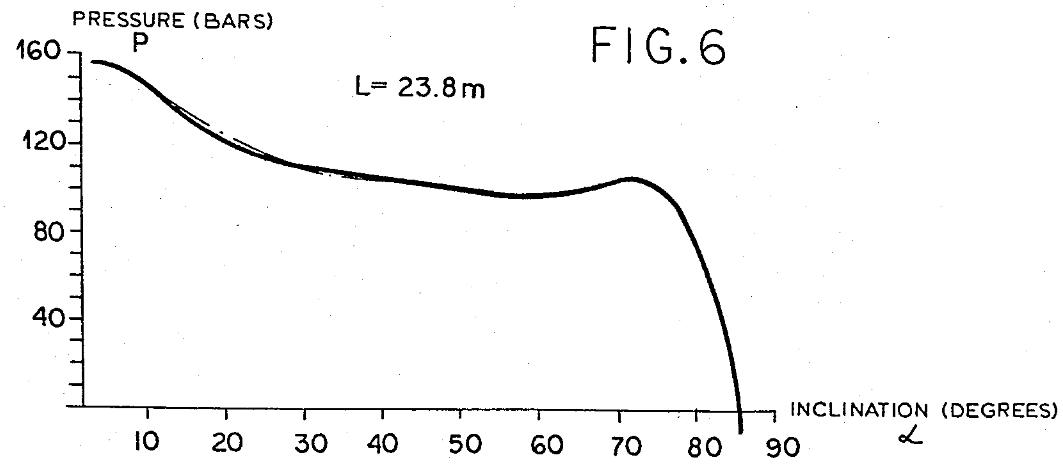
Figure 7:
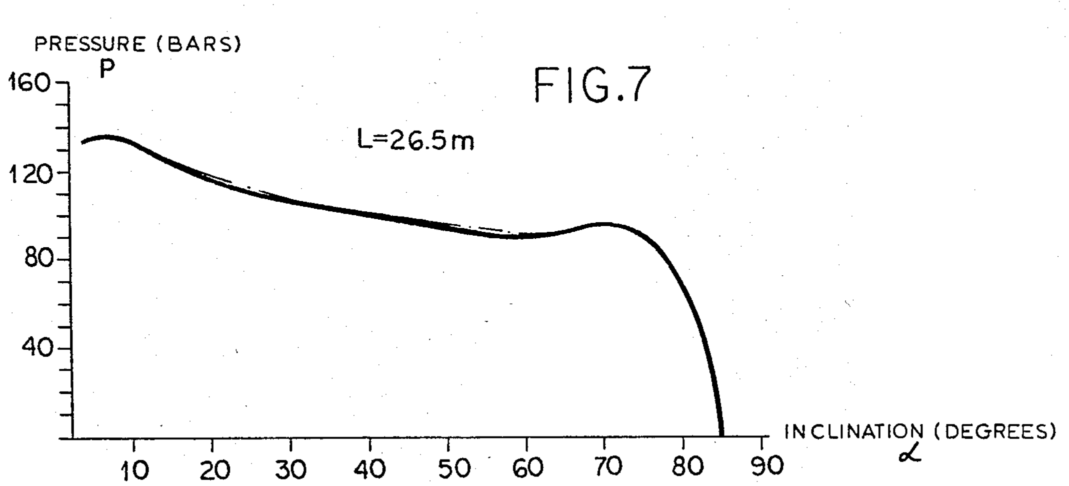
Figure 8:
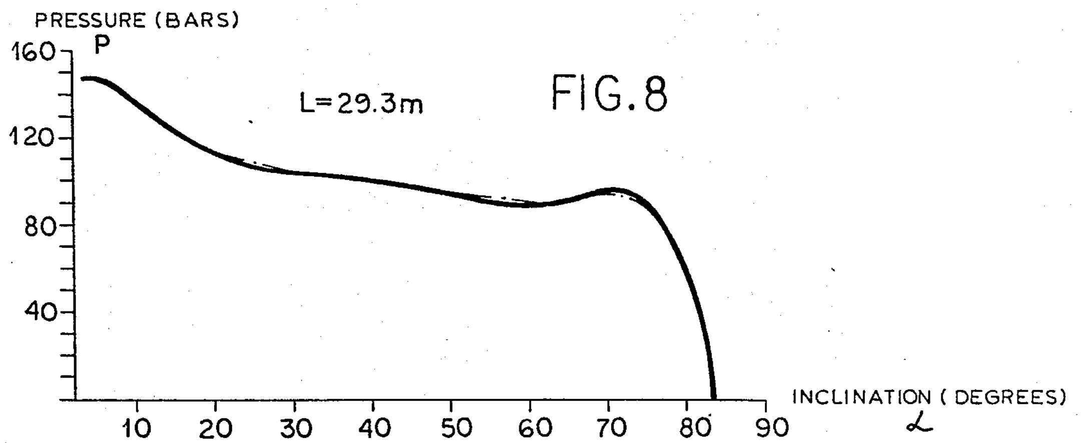
Figure 9:
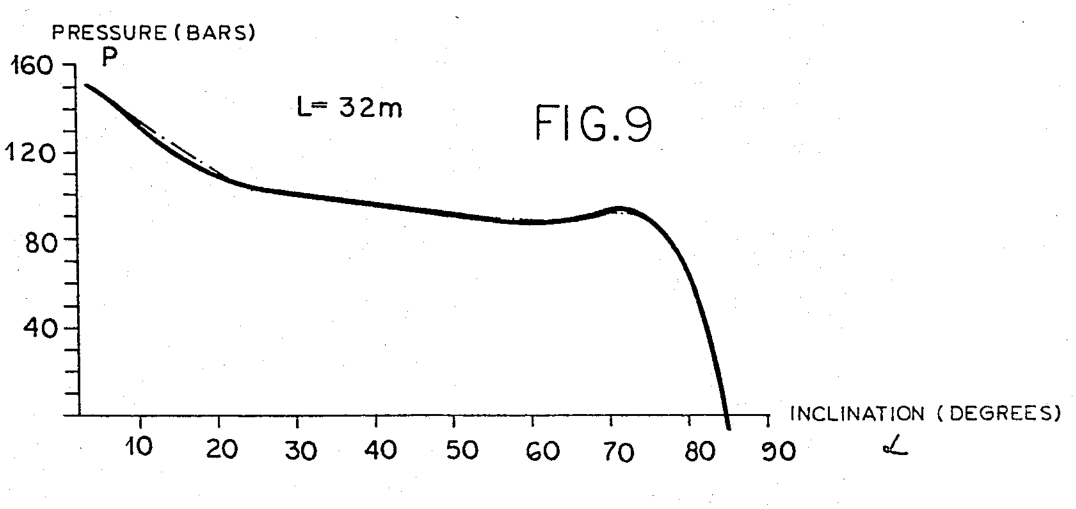
Figure 10:
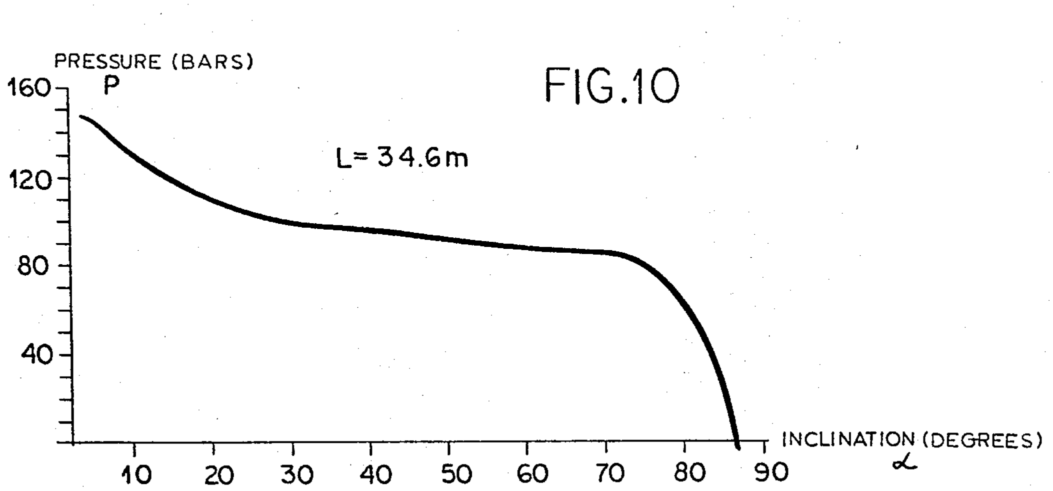
Figure 11:
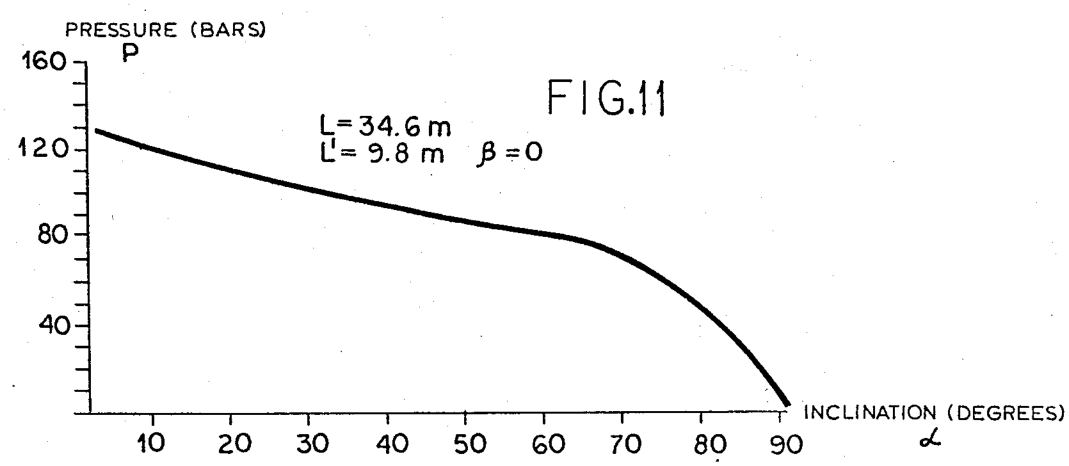
Figure 12:
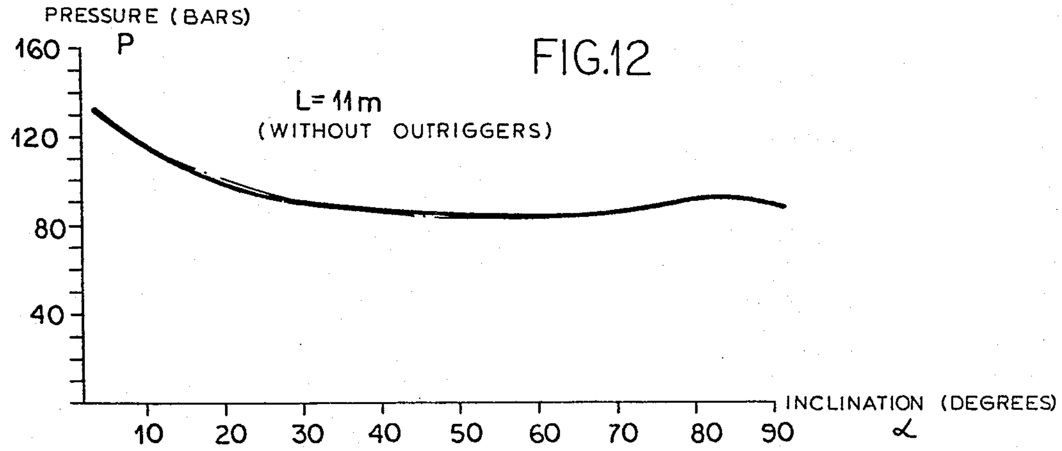
Figure 13:
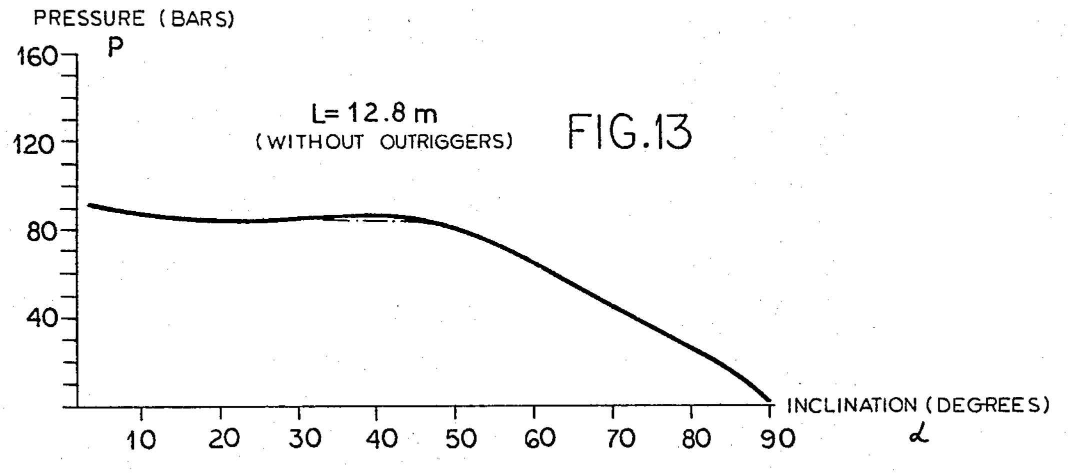
Figure 14:
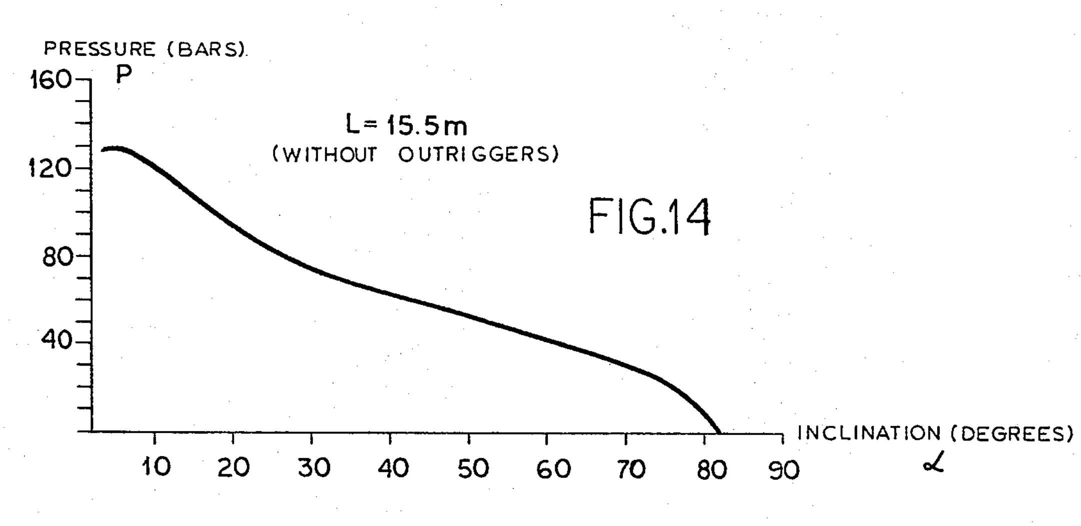
Figure 15:
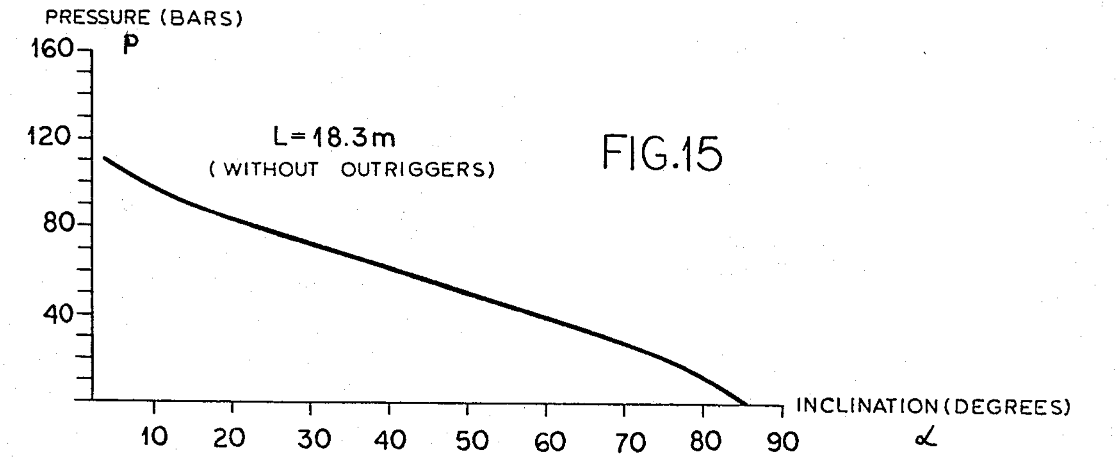
Figure 16:
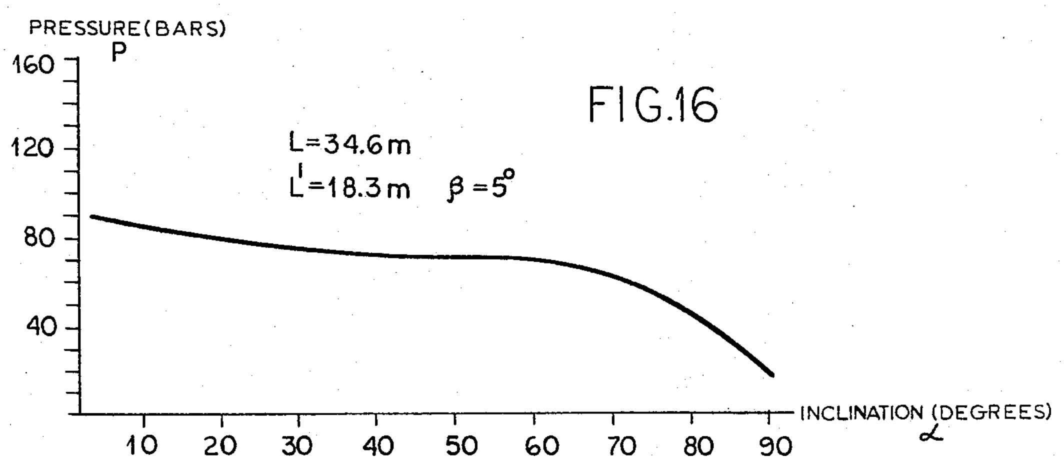
Figure 17:
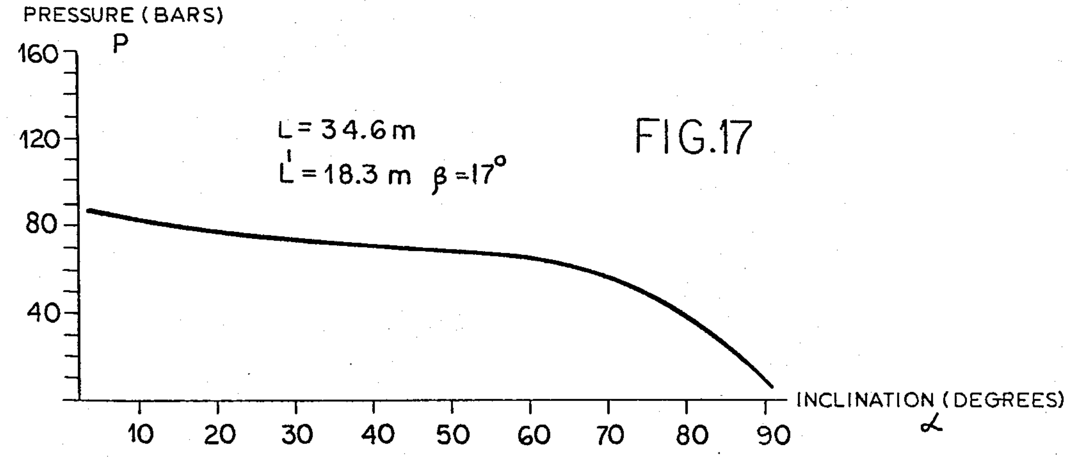
Figure 18:
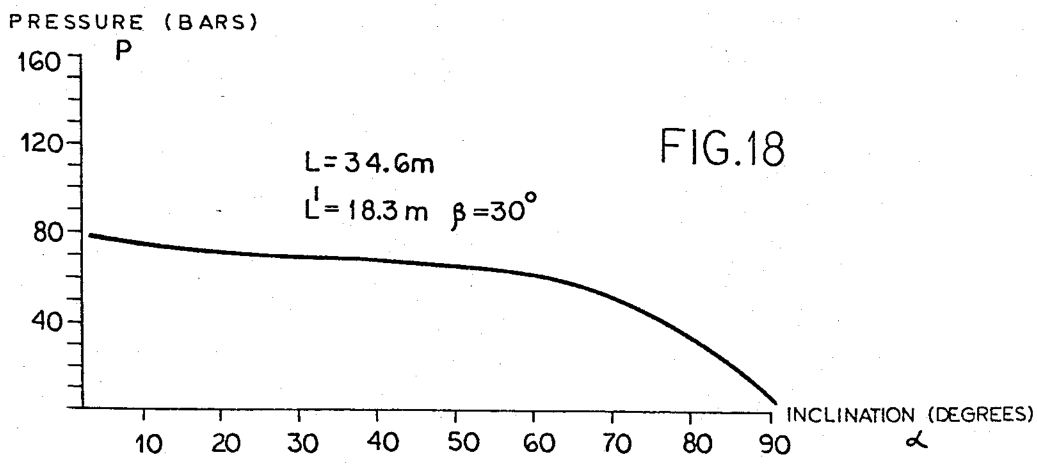

In the following Table I have listed the polynomial coefficients $K_0$–$K_6$ for the function $P=K_6\alpha^6+K_5\alpha^5+K_4\alpha^4+K_3\alpha^3+K_2\alpha^2+K_1\alpha+K_0$. The curves of FIGS. 1 and 3 are only polynomials of the fifth order, with $K_6=0$, while the others are all of the sixth order. The boom length L is variable between 11 and 34.6 meters while the pressure P goes up to about 160 bars. The operative range of elevational angle $\alpha$ may extend between about 20° and 80°. Processor 26 could be of the digital or the analog type.

TABLE

| FIG. | $K_6$ | $K_5$ | $K_4$ | $K_3$ | $K_2$ | $K_1$ | $K_0$ |
|---|---|---|---|---|---|---|---|
| | | | (Sheet 1 of 2) | | | | |
| 1 | — | $-2.454 \cdot 10^{-6}$ | $+5.1757 \cdot 10^{-4}$ | −.041719 | +1.6048 | −29.6 | +336 |
| 2 | $-4.0398 \cdot 10^{-8}$ | $+1.0668 \cdot 10^{-5}$ | $-1.06224 \cdot 10^{-3}$ | +.047047 | −.7347 | −6.2 | +322 |
| 3 | — | $+5.7216 \cdot 10^{-7}$ | $-1.54835 \cdot 10^{-4}$ | +.0140481 | −.503474 | +5.13 | +150 |
| 4 | $+2.0512 \cdot 10^{-9}$ | $-1.59879 \cdot 10^{-6}$ | $+2.94917 \cdot 10^{-4}$ | −.0239869 | +.99013 | −20.69 | +293.4 |
| 5 | $-2.89809 \cdot 10^{-8}$ | $+6.24778 \cdot 10^{-6}$ | $-5.00074 \cdot 10^{-4}$ | +.0181953 | −.28556 | +.57 | +140 |
| 6 | $-3.86449 \cdot 10^{-8}$ | $+9.17911 \cdot 10^{-6}$ | $-8.35448 \cdot 10^{-4}$ | +.0361875 | −.72467 | +3.84 | +150.2 |
| 7 | $-3.70163 \cdot 10^{-8}$ | $+8.83344 \cdot 10^{-6}$ | $-8.12119 \cdot 10^{-4}$ | +.−35996 | −.77125 | +5.92 | +120.7 |
| 8 | $-4.64169 \cdot 10^{-8}$ | $+1.096449 \cdot 10^{-5}$ | $-9.86319 \cdot 10^{-4}$ | +.0417252 | −.80309 | +4.16 | +140 |
| 9 | $-3.49589 \cdot 10^{-8}$ | $+8.05023 \cdot 10^{-6}$ | $-6.97225 \cdot 10^{-4}$ | +.0276561 | −.4568 | +.2 | +152.6 |
| 10 | $-1.95007 \cdot 10^{-8}$ | $+4.58905 \cdot 10^{-6}$ | $-4.10366 \cdot 10^{-4}$ | +.0169224 | −.28513 | −.58 | +150 |
| | | | (Sheet 2 of 2) | | | | |

TABLE-continued

| FIG. | $K_6$ | $K_5$ | $K_4$ | $K_3$ | $K_2$ | $K_1$ | $K_0$ |
|---|---|---|---|---|---|---|---|
| 11 | $+3.465 \cdot 10^{-9}$ | $-1.04239 \cdot 10^{-6}$ | $+1.12233 \cdot 10^{-4}$ | $-5.596 \cdot 10^{-3}$ | +1.4021 | −2.61 | +135 |
| 12 | $-3.7693 \cdot 10^{-9}$ | $+9.1763 \cdot 10^{-7}$ | $-7.9738 \cdot 10^{-5}$ | $+2.6542 \cdot 10^{-3}$ | +.0119 | −2.99 | +140 |
| 13 | $-6.818 \cdot 10^{-9}$ | $+1.87333 \cdot 10^{-6}$ | $-1.87801 \cdot 10^{-4}$ | $+8.049 \cdot 10^{-3}$ | −.13677 | +.38 | +89.9 |
| 14 | $-1.77664 \cdot 10^{-8}$ | $+4.73947 \cdot 10^{-6}$ | $-4.95162 \cdot 10^{-4}$ | +.0251307 | −.60798 | +4.01 | +120 |
| 15 | $+1.69329 \cdot 10^{-9}$ | $-5.959 \cdot 10^{-7}$ | $+7.7739 \cdot 10^{-5}$ | $-4.9058 \cdot 10^{-3}$ | +.15918 | −3.64 | +120 |
| 16 | $-3.86449 \cdot 10^{-8}$ | $-7.4358 \cdot 10^{-7}$ | $+6.5301 \cdot 10^{-5}$ | $-2.5675 \cdot 10^{-3}$ | +.05353 | −1.14 | +92 |
| 17 | $+1.76913 \cdot 10^{-9}$ | $-4.6387 \cdot 10^{-7}$ | $+4.1161 \cdot 10^{-5}$ | $-1.6021 \cdot 10^{-3}$ | +.03174 | −.8 | +88 |
| 18 | $+1.24869 \cdot 10^{-9}$ | $-3.1667 \cdot 10^{-7}$ | $+2.7806 \cdot 10^{-5}$ | $-1.2086 \cdot 10^{-3}$ | +.03145 | −.72 | +78 |

It is to be understood that my invention is also applicable to a crane in which the elevation of the boom is controlled by a hoisting cable, as in the above-identified British patent, whose tension is measured by a sensor as representative of the actual load. Curves generally similar to those of FIGS. 1–18, with tension instead of pressure plotted along the ordinate, would be used in such a system.

I claim:

1. A load-monitoring system for use aboard a crane having an extendable boom inclinable at different angles to the horizontal, comprising:

first sensing means for generating a first signal representative of the effective length of said boom;

second sensing means for generating a second signal representative of the elevational angle of said boom;

memory means storing a plurality of sets of coefficients of polynomials of at least the fifth order closely approximating respective curves giving the maximum permissible load for different boom lengths as a function of a variable parameter related to boom inclination, said memory means being addressable by said first sensing means for reading out a set of coefficients selected in response to said first signal;

processing means connected to said memory means and to said second sensing means for calculating a numerical value of the polynomial defined by the selected set of coefficients which corresponds to said variable parameter as determined by said second signal;

measuring means engageable with said boom for determining the magnitude of a load supported thereby; and comparison means with inputs connected to said processing means and to said measuring means for generating an alarm signal upon said magnitude exceeding a permissible limit determined by said numerical value.

2. A system as defined in claim 1 wherein said memory means is reprogrammable to modify the stored sets of coefficients in accordance with additional crane parameters.

3. A system as defined in claim 1 wherein said measuring means comprises a pressure sensor or a cylinder of a hydraulic jack anchored to a fixed base and to an intermediate point of the boom.

4. A system as defined in claim 1, further comprising selector means connected to an address input of said memory means for further determining the set of coefficients to be read out and having positions representing utilization and nonutilization of outriggers for said crane and of an ancillary boom articulated at an end of the first mentioned boom remote from an operator's cab, and an azimuthal angle by which the cab and said booms have been rotated.

* * * * *